US012125223B2

(12) United States Patent
Busam et al.

(10) Patent No.: US 12,125,223 B2
(45) Date of Patent: Oct. 22, 2024

(54) TIME-OF-FLIGHT DEPTH ENHANCEMENT

(71) Applicant: HUAWEI TECHNOLOGIES CO., LTD., Shenzhen (CN)

(72) Inventors: Benjamin Busam, Munich (DE); Patrick Ruhkamp, Munich (DE); Matthieu Hog, London (GB); Yannick Verdie, Toronto (CA); Ales Leonardis, London (GB); Gregory Slabaugh, London (GB)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 365 days.

(21) Appl. No.: 17/586,034

(22) Filed: Jan. 27, 2022

(65) Prior Publication Data
US 2022/0222839 A1    Jul. 14, 2022

Related U.S. Application Data (63) Continuation of application No. PCT/EP2019/071232, filed on Aug. 7, 2019.

(51) Int. Cl.
*G06T 7/514* (2017.01)

(52) U.S. Cl.
CPC .... *G06T 7/514* (2017.01); *G06T 2207/10024* (2013.01); *G06T 2207/20081* (2013.01)

(58) Field of Classification Search
CPC .......... G06T 7/514; G06T 2207/10024; G06T 2207/20081; G06T 2207/10028; G06T 5/50; G01S 7/4808; G01S 7/894; G01S 17/36
See application file for complete search history.

(56) References Cited

U.S. PATENT DOCUMENTS

| 8,134,637 B2 | 3/2012 | Rossbach et al. |
| 8,265,425 B2 | 9/2012 | Ng-Thow-Hing et al. |
| 9,760,837 B1 | 9/2017 | Nowozin et al. |

(Continued)

OTHER PUBLICATIONS

Wen et al., "Deep Color Guided Coarse-to-Fine Convolutional Network Cascade for Depth Image Super-Resolution", IEEE Transactions on Image Processing, IEEE Service Center, Piscataway, NJ, US, vol. 28, No. 2, Feb. 1, 2019, pp. 994-1006, XP011701957.

(Continued)

*Primary Examiner* — Edward F Urban
*Assistant Examiner* — Wassim Mahrouka
(74) *Attorney, Agent, or Firm* — Maier & Maier, PLLC (57) ABSTRACT

An image processing system configured to receive an input time-of-flight depth map representing the distance of objects in an image from a camera at a plurality of locations of pixels in the respective image, and in dependence on that map to generate an improved time-of-flight depth map for the image, the input time-of-flight depth map having been generated from at least one correlation image representing the overlap between emitted and reflected light signals at the plurality of locations of pixels at a given phase shift, the system being configured to generate the improved time-of-flight depth map from the input time-of-flight depth map in dependence on a colour representation of the respective image and at least one correlation image.

15 Claims, 10 Drawing Sheets

(56) References Cited

U.S. PATENT DOCUMENTS

| | | | | |
|---|---|---|---|---|
| 2016/0086318 | A1* | 3/2016 | Hannuksela | G06T 5/50 |
| | | | | 348/43 |
| 2017/0272651 | A1* | 9/2017 | Mathy | H04N 5/2226 |
| 2018/0205926 | A1* | 7/2018 | Mogalapalli | H04N 13/128 |
| 2021/0004937 | A1* | 1/2021 | Bleyer | G01S 17/894 |
| 2021/0248719 | A1* | 8/2021 | Park | G06T 7/90 |
| 2021/0327091 | A1* | 10/2021 | Park | G06V 10/80 |

OTHER PUBLICATIONS

Su et al., "Deep End-to-End Time-of-Flight Imaging", Proceedings of the IEEE Conference on Computer Vision and Pattern Recognition, 2018, 10 pages.

Noraky et al., "Low Power Depth Estimation of Rigid Objects for Time-of-Flight Imaging", Proceedings of the IEEE Transactions on Circuits and Systems for Video Technology, Mar. 25, 2019, 11 pages.

Agresti et al., "Deep Learning for Confidence Information in Stereo and ToF Data Fusion", Proceedings of the IEEE International Conference on Computer Vision, 2017, 9 pages.

Agresti et al., "Deep Learning for Multi-path Error Removal in ToF Sensors", Proceedings of the European Conference on Computer Vision (ECCV), 2018, 16 pages.

Agresti et al., "Unsupervised Domain Adaptation for ToF Data Denoising with Adversarial Learning", CVPR 2019, 10 pages.

Barron, "A General and Adaptive Robust Loss Function", CVPR 2019, 9 pages.

Khamis et al., "StereoNet: Guided Hierarchical Refinement for Real-Time Edge-Aware Depth Prediction", ECCV 2018, 18 pages.

* cited by examiner

Figure 6 (c) Ground Truth Depth

Figure 6 (b) Upsampled ToF Output

Figure 6 (a) ToF Input

TIME-OF-FLIGHT DEPTH ENHANCEMENT

CROSS-REFERENCE TO RELATED APPLICATIONS

This application is a continuation of International Application No. PCT/EP2019/071232, filed on Aug. 7, 2019, which is hereby incorporated by reference in their entirety.

TECHNICAL FIELD

The embodiments relate to image formation in digital photography and generating an enhanced time-of-flight depth map for an image.

BACKGROUND

Figure 1:
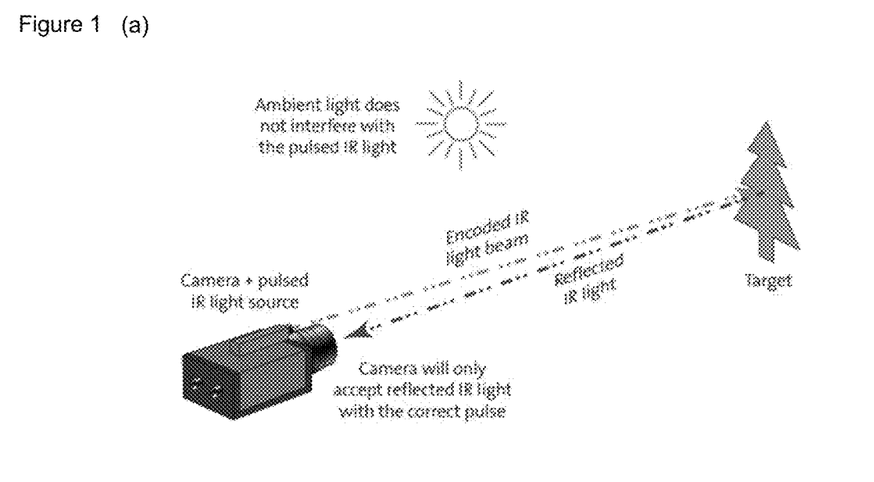
FIG. 1(a) illustrates the acquisition of ToF depth data.
FIG. 1(b) illustrates the acquisition of ToF depth data.

Time-of-flight (ToF) sensors are used to measure the distance between objects captured by the camera and the sensor plane. As illustrated in FIG. 1(a), by illuminating a scene with a pulsed light source, the light is reflected by objects in the scene and its roundtrip time is measured. Using the measured roundtrip time, and with knowledge of the speed of light, one can estimate the distance of reflecting objects from the camera. This calculation can be performed for every pixel in the image. The distance stored at a specific pixel location is called its depth and a 2D image encoding these values for each pixel is called a depth map.

In ToF imaging, the depth map results from a RAW measurement which correlates the reflected light with a phase-shifted input pulse, as illustrated in FIG. 1(b). The so-produced images are called correlation images. While this sensing approach works well in low-light scenarios and the computation can be done comparably fast with respect to other depth estimation approaches such as stereo vision, current time-of-flight sensors suffer from drawbacks such as multi-path reflections and have problems with strong ambient light. Moreover, their spatial resolution is very limited. This ultimately hinders depth from ToF to be used in 2D and 3D computer vision applications where high resolution, accuracy and precision are crucial aspects for quality data and satisfying user experience.

Figure 2:
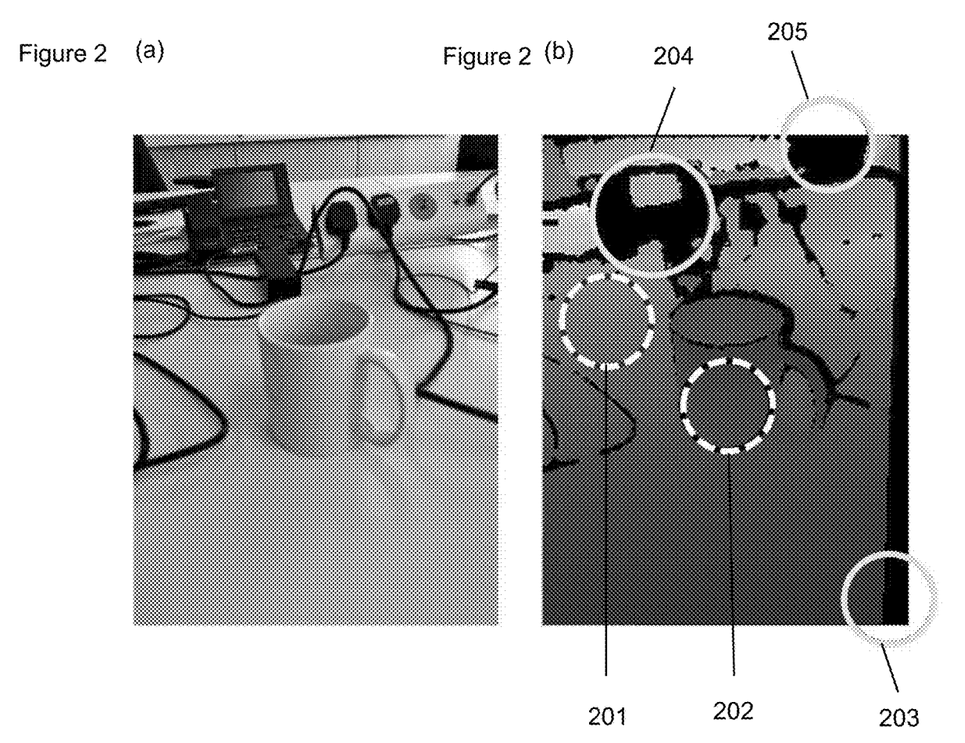
FIG. 2(a) illustrates a photographic image.
FIG. 2(b) illustrates a ToF depth map corresponding to the image of FIG. 2(a).

FIG. 2(a) shows a photographic image and FIG. 2(b) shows an aligned ToF depth map corresponding to the image. The photographic image is formed from an RGB camera. In the ToF depth map, the grey levels encode the distance, with brighter areas being further away.

Within the dashed circle at 201, small objects have been oversmoothed or smoothed out. For example, the distance of the thin black cables is not correctly measured. At 202, however, the gradient is nicely recovered even for this visually challenging part of the image. Therefore, the ToF sensor provides a correct gradient measurement in this reflecting area. These textureless areas are difficult for classical depth estimation approaches to handle. In the solid circles, shown at 204 and 205, dark objects, as well as far away objects, may not be correctly captured. Moreover, the low depth image resolution (in this example 240×180 pixels) suffers from additional information loss through image alignment, which can be seen in the lower right corner at 203 of FIG. 2(b), which further inhibits the useable portion of the ToF depth map.

There have been several attempts to overcome the drawbacks of low quality ToF data by either enriching the data with another input source or utilizing the capabilities of machine learning through data pre-processing.

Methods employing deep learning for ToF include Su, Shuochen, et al., "Deep end-to-end time-of-flight imaging", Proceedings of the IEEE Conference on Computer Vision and Pattern Recognition 2018, where it is proposed to use an end-to-end learning pipeline that maps the RAW correlation signal to a depth map. A network is trained on a synthetic dataset. This method can generalize, to some extent, to real data.

In another approach, U.S. Pat. No. 9,760,837 B1 describes a method for depth estimation with time-of-flight. This method uses the RAW correlation signal and produces a same-resolution depth output.

In Agresti, Gianluca, et al., "Deep learning for confidence information in stereo and tof data fusion", Proceedings of the IEEE International Conference on Computer Vision 2017, and Agresti, Gianluca, and Pietro Zanuttigh, "Deep learning for multi-path error removal in ToF sensors", Proceedings of the European Conference on Computer Vision 2018, classical stereo vision is fused with time-of-flight sensing to increase resolution and accuracy of both synthetically created data modalities. The RGB data input pipeline is not learned and thus the use of the RGB is only indirect by leveraging the predicted stereo depth maps. The ToF data is separately reprojected and upsampled with a bilateral filter.

U.S. Pat. No. 8,134,637 B2 proposes a method to super-resolve the depth image of a ToF sensor with the help of an RGB image without learning. This method is not a one-step approach, so the multiple individual modules of their method propagate an error each which accumulates through the pipeline.

SUMMARY

According to a first aspect, there is provided an image processing system configured to receive an input time-of-flight depth map representing the distance of objects in an image from a camera at a plurality of locations of pixels in the respective image, and in dependence on that map to generate an improved time-of-flight depth map for the image, the input time-of-flight depth map having been generated from at least one correlation image representing the overlap between emitted and reflected light signals at the plurality of locations of pixels at a given phase shift, the system being configured to generate the improved time-of-flight depth map from the input time-of-flight depth map in dependence on a color representation of the respective image and at least one correlation image.

Thus, the input ToF depth map may be enriched with features from the RAW correlation signal and processed with co-modality guidance from aligned color images. The system therefore utilizes cross-modality advantages. ToF depth errors may also be corrected. Missing data may be recovered and multi-path ambiguities may be resolved via RGB-guidance.

The color representation of the respective image may have a higher resolution than the input time-of-flight depth map and/or the at least one correlation image. This may increase the resolution of the improved time-of-flight depth map.

The system may be configured to generate the improved time-of-flight depth map by a trained artificial intelligence model. The trained artificial intelligence model may be an end-to-end trainable neural network. Because the pipeline is trainable end-to-end, accessing all three different modalities (color, depth, and RAW correlation) at the same time may improve the overall recovered depth map. This may increase the resolution, accuracy, and precision of the ToF depth map.

The model may be trained using at least one of: input time-of-flight depth maps, correlation images and color representations of images.

The system may be configured to combine the input time-of-flight depth map with the at least one correlation image to form a correlation-enriched time-of-flight depth map. Enriching the input ToF depth map with the encoded features from a low-resolution RAW correlation signal may help to reduce depth errors.

The system may be configured to generate the improved time-of-flight depth map by hierarchically upsampling the correlation-enriched time-of-flight depth map in dependence on the color representation of the respective image. This may help to improve and sharpen depth discontinuities.

The improved time-of-flight depth map may have a higher resolution than the input time-of-flight depth map. This may allow for improvement when rendering images captured by a camera.

The color representation of the respective image may be a color-separated representation. It may be an RGB representation. This may be a convenient color representation to use in the processing of the depth map.

According to a second aspect, there is provided a method for generating an improved time-of-flight depth map for an image in dependence on an input time-of-flight depth map representing the distance of objects in the image from a camera at a plurality of locations of pixels in the respective image, the input time-of-flight depth map having been generated from at least one correlation image representing the overlap between emitted and reflected light signals at the plurality of locations of pixels at a given phase shift, the method including generating the improved time-of-flight depth map from the input time-of-flight depth map in dependence on a color representation of the respective image and at least one correlation image.

Thus, the input ToF depth map may be enriched with features from the RAW correlation signal and processed with co-modality guidance from aligned color images. The method therefore utilizes cross-modality advantages. ToF depth errors may also be corrected. Missing data may be recovered and multi-path ambiguities may be resolved via RGB-guidance.

The color representation of the respective image may have a higher resolution than the input time-of-flight depth map and/or the at least one correlation image. This may improve the resolution of the improved time-of-flight depth map.

The method may include generating the improved time-of-flight depth map by a trained artificial intelligence model. The trained artificial intelligence model may be an end-to-end trainable neural network. Because the pipeline is trainable end-to-end, accessing all three different modalities (color, depth, and RAW correlation) at the same time may improve the overall recovered depth map. This may increase the resolution, accuracy, and precision of the ToF depth map.

The method may further include combining the input time-of-flight map with the at least one correlation image to form a correlation-enriched time-of-flight depth map. Enriching the input ToF depth map with the encoded features from a low-resolution RAW correlation signal may help to reduce depth errors.

The method may further include hierarchically upsampling the correlation-enriched time-of-flight depth map in dependence on the color representation of the respective image. This may help to improve and sharpen depth discontinuities and may improve the resolution of the improved time-of-flight depth map.

BRIEF DESCRIPTION OF THE FIGURES

The embodiments will now be described by way of example with reference to the accompanying drawings. In the drawings.

DETAILED DESCRIPTION OF THE EMBODIMENTS

Figure 3:
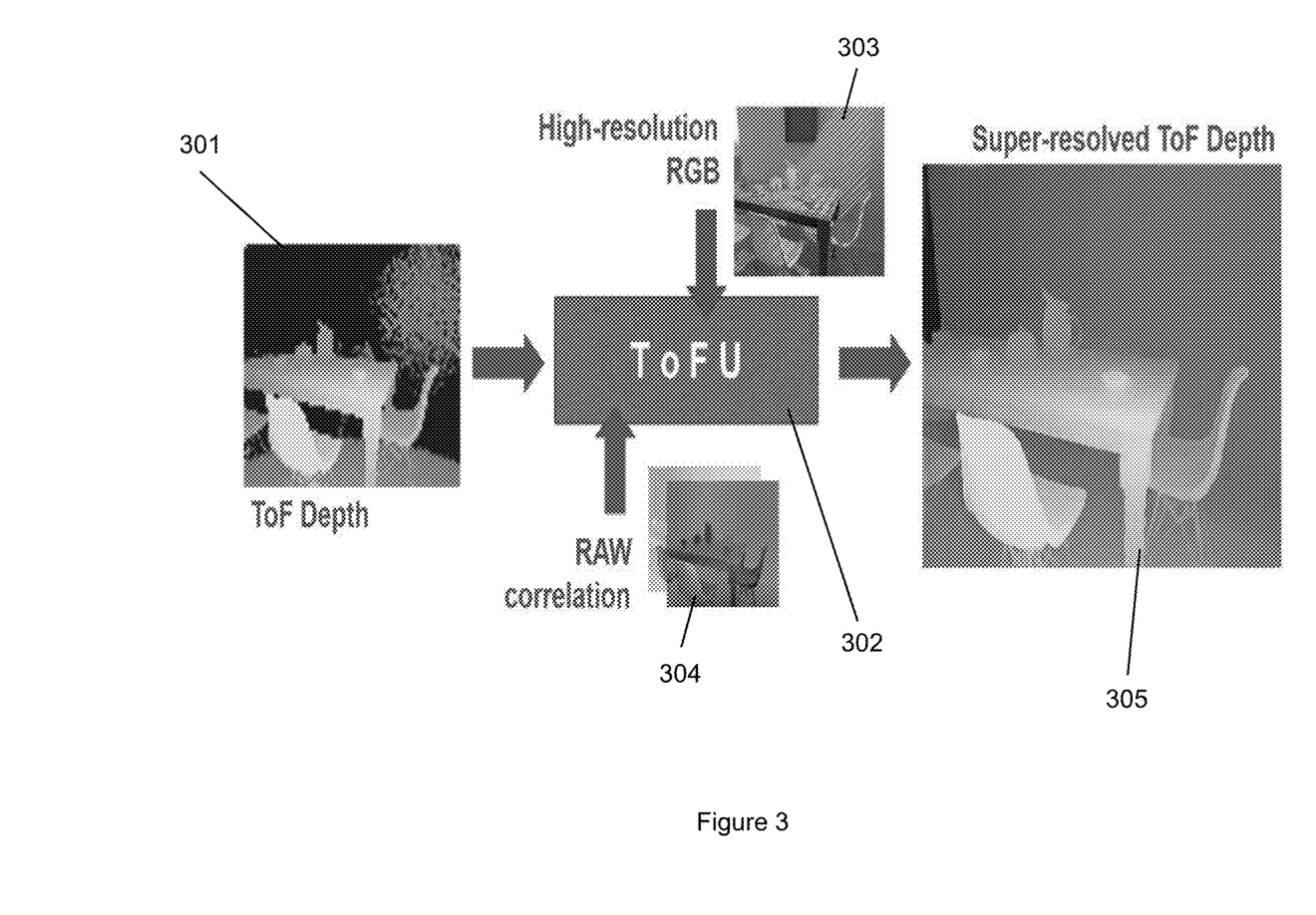
FIG. 3 illustrates an overview of an example of a pipeline for processing a ToF depth map.

FIG. 3 shows an overview of an exemplary pipeline for generating an enhanced ToF depth map. The pipeline of FIG. 3 includes an end-to-end trainable neural network. The pipeline takes as an input a ToF depth map 301 of relatively low resolution and quality or density (compared to the output ToF depth map 305). The input time-of-flight depth map 301 represents the distance of objects in an image from a camera at a plurality of locations of pixels in the respective image.

The input ToF depth map 301 is generated from at least one RAW correlation image representing the overlap between emitted and reflected light signals at the plurality of locations of pixels at a given phase shift. As is well known in the art, using the speed of light, this RAW correlation image data is processed to generate the input ToF depth map 301. This processing of the RAW correlation data to form the input ToF depth map 301 may be performed separately from the pipeline, or in an initialization step of the pipeline. The noisy input ToF depth map 301 is fed into the learning framework (labelled ToF upsampling, ToFU), indicated at 302.

The pipeline also takes as an input a color representation 303 of the respective image for which the input ToF depth map 301 has been generated. In this example, the color representation is a color-separated representation, such as an RGB image. However, the color representation 303 may include one or more channels.

The pipeline also takes as an input at least one RAW correlation image, as shown at 304. Therefore, multi-modality input data is used.

The system is configured to generate an improved output ToF depth map 305 from the input ToF depth map 301 in dependence on the color representation of the respective image 303 and at least one correlation image 304.

Figure 4:
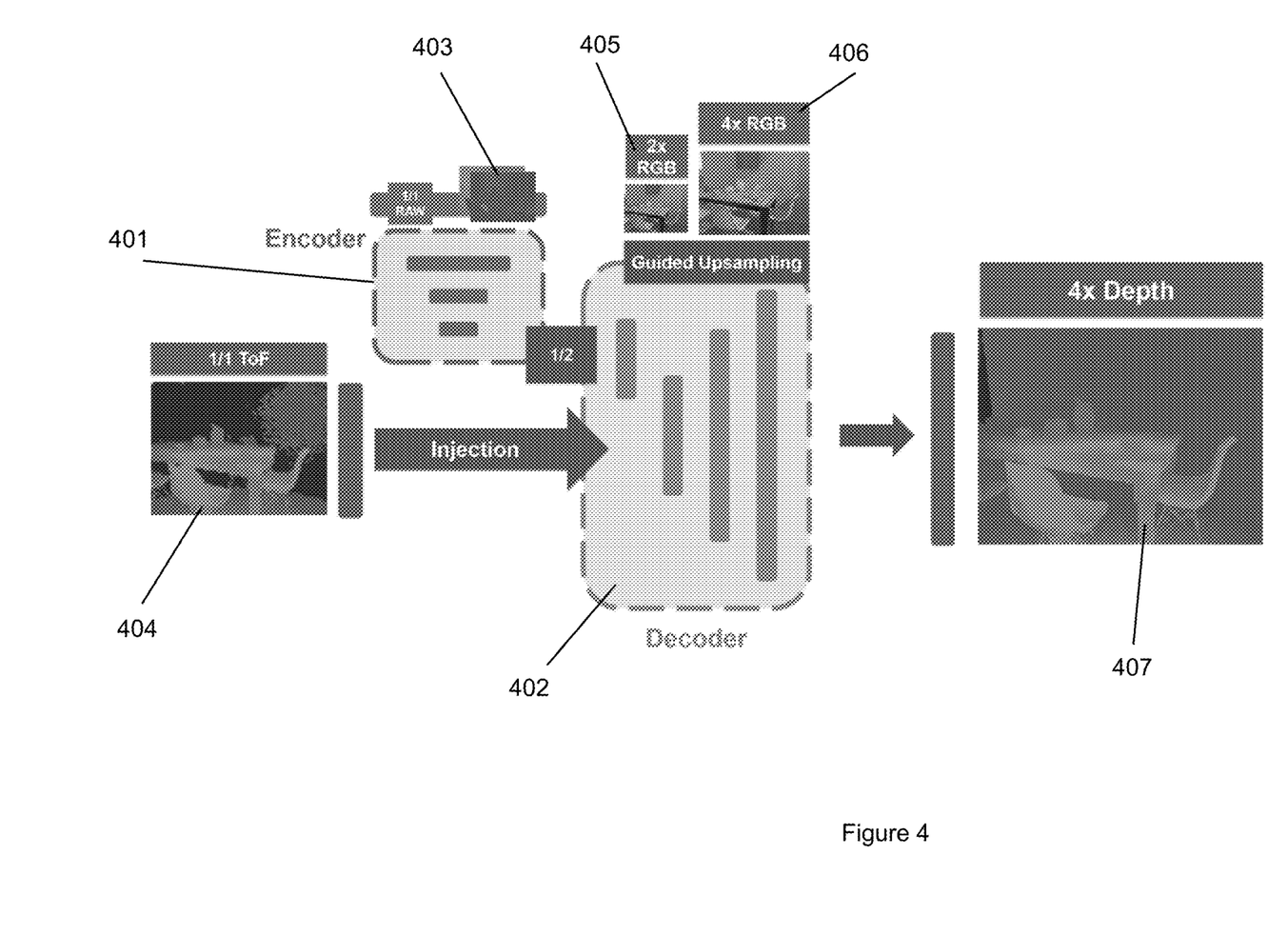
FIG. 4 illustrates an exemplary overview of a pipeline for processing a ToF depth map, where a shallow encoder takes RAW correlation images as input, and during the decoding stage, noisy ToF depth data is injected and upsampled to four times the original resolution with RGB guidance.

The system and method will now be described in more detail below with reference to FIG. 4.

In this example, an end-to-end neural network includes an encoder-decoder convolutional neural network with a shallow encoder 401 and a decoder 402 with guided upsampling and depth injection. The shallow encoder 401 takes RAW correlation images 403 as input. The network encodes the RAW correlation information 403 at the original resolution of 1/1 from the ToF sensor to extract deep features for depth prediction.

During the decoding stage, the input ToF depth data, shown at 404 (which may be noisy and corrupted) is injected (i.e., combined with the RAW correlation data) at the original resolution 1/1 and is then hierarchically upsampled to four times the original resolution with RGB guidance. The input ToF depth information is injected in the decoder 402 at the ToF input resolution stage, thus supporting the network to predict depth information with metric scale.

RGB images at 2× and 4× the original resolution of the ToF depth map, shown at 405 and 406 respectively, are utilized during guided upsampling (GU) to support the residual correction of a directly upsampled depth map and to enhance boundary precision at depth discontinuities.

The noisy ToF depth data 404 is therefore injected and upsampled to four times the original resolution with RGB guidance to generate an enhanced ToF depth map, shown at 407.

Co-injection of RGB and RAW correlation image modalities helps to super-resolve the input ToF depth map by leveraging additional information to fill the holes (black areas in the input ToF depth map), predict further away regions and resolve ambiguities due to multi-path reflections.

The above-described method may reliably recover the depth for the whole scene, despite the depth injection from the input ToF depth map 301 being noisy and corrupted and far away pixel values being invalidated. The guided upsampling helps to improve and sharpen depth discontinuities. In this example, the final output is four times the resolution of the original input ToF depth map 301. However, the input ToF depth map 301 may also be upsampled to higher resolutions.

In summary, the modalities utilized are as follows:

INPUT: RAW correlation images (low resolution), input ToF depth map (low resolution) and RGB image (high resolution).

OUTPUT: Upsampled depth map (high resolution).

The modalities complement each other and ToFU extracts useful information from each modality in order to produce the final super-resolved output ToF depth map.

An exemplary network architecture is described as follows. Other configurations are possible. Layers for Encoder: 1× 2D-Convolutions of RAW Correlation Input (→1/2 Input Resolution)

Layers before Injection: 1× 2D-UpConvolution (from 1/2 Input Resolution to 1/1 Input Resolution)
Decoder and Guided Upsampler
Depth Injection:
  For each Input:
    2D Conv→BatchNorm→LeakyReLu→ResNetBlock→ResNetBlock
  Concatenation
  4× ResNetBlock
  Residual=2D-Convolution
  Output=Depth+Residual
  Concatenation of UpConvolution (before Injection)+Injection Output
  Convolution of Concatenation+Upsampling with Bilinear UpSampling (Depth Prediction at 1× Input Resolution)
  Layers before GU 1: 1× 2D-UpConvolution of Convolution of Concatenation (from 1/1 Input Resolution to 2× Input Resolution)
Guided Upsampling Stage 1:
  For each Input:
    2D Conv→BatchNorm→LeakyReLu→ResNetBlock→ResNetBlock
  Concatenation
  4× ResNetBlock
  Residual=2D-Convolution
  Output=Depth+Residual
  Concatenation of UpConvolution+Guided Upsampling Output
  Convolution of Concatenation and Upsampling with Bilinear UpSampling (Depth Prediction at 2× Input Resolution)
  Layers before GU 2: 1× 2D-UpConvolution of Convolution of Concatenation (from 2× Input Resolution to 4× Input Resolution)
Guided Upsampling Stage 2:
  For each Input:
    2D Conv→BatchNorm→LeakyReLu→ResNetBlock→ ResNetBlock
  Concatenation
  4× ResNetBlock
  Residual=2D-Convolution
  Output=Depth+Residual
  Concatenation of UpConvolution+Guided Upsampling Output
  Convolution of Concatenation and Prediction of Depth (Depth Prediction at 4× Input Resolution)

Equations (1)-(4) below describe an exemplary Loss Function. For training the proposed network, the pixel-wise difference between the predicted inverse depth to mimic a disparity and the ground truth is minimized by exploiting a robust norm for fast convergence together with a smoothness term:

$$L_{Total} = \omega_S L_{Smooth} + \omega_D L_{Depth} \quad (1)$$

where:

$$L_{smooth} = \Sigma |\nabla D(p)|^T e^{-|\nabla I(p)|} \quad (2)$$

and:

$$L_{Depth} = \Sigma \omega_{scale} |D(p) - D_{Pred}(P)|_{Barron} \quad (3)$$

where $|*|_{Barron}$ is the Barron Loss as proposed in Barron, "A General and Adaptive Robust Loss Function," CVPR 2019, in the special form of a smoothed $L_1$ norm:

$$f(x) = \sqrt{(x/2)^2 + 1} - 1 \quad (4)$$

$\omega_{Scale}$ accounts for the contribution of $L_{Depth}$ at each scale level, and D is the inverse depth and I is the RGB image. As the disparity values for lower scale levels should be scaled accordingly (for example, half the resolution results in half the disparity value), the value for the loss term should be scaled inversely by the same scale parameter. Additionally, the number of pixels decreases quadratically with every scale level, resulting in a scale weight for equal contribution of each scale level of: $\omega_{Scale}=\text{Scale}*\text{Scale}^2=\text{Scale}^3$.

In one implementation, for generating training data, together with accurate depth ground truth, a physics-based rendering pipeline (PBRT) may be used together with Blender, as proposed in Su, Shuochen, et al., "Deep end-to-end time-of-flight imaging", Proceedings of the IEEE Conference on Computer Vision and Pattern Recognition 2018. A low resolution version of the depth is clipped and corrupted with noise to simulate the ToF depth input signal.

Figure 5:
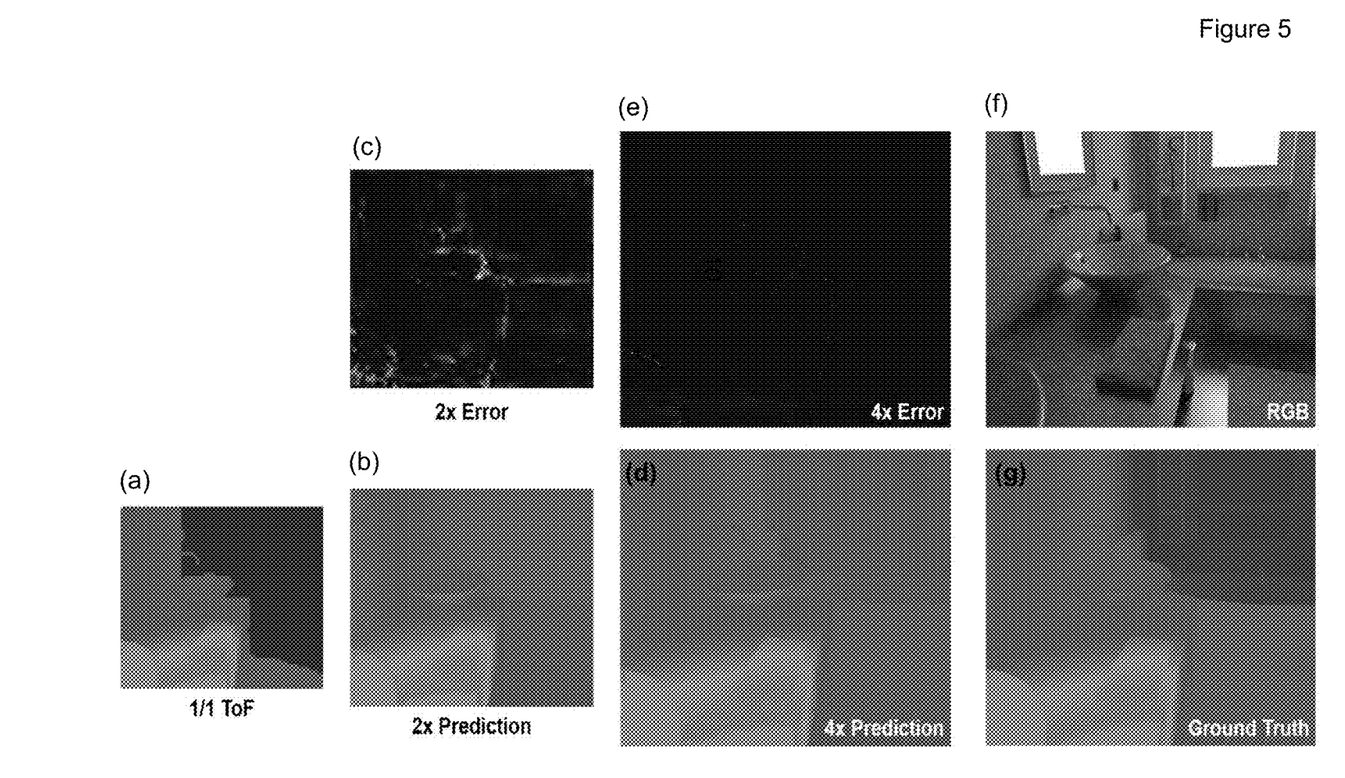
FIGS. 5(a)-(f) illustrates results of the proposed pipeline for ToF upsampling with multi-modality guided upsampling (GU).

FIG. 5 illustrates results of the proposed pipeline for ToF upsampling with multi-modality guided upsampling. The input ToF depth map is shown in FIG. 5(a). The predicted depth map after upsampling to 2× resolution is shown in FIG. 5(b), with the resulting error shown in FIG. 5(c). The predicted depth map after upsampling to 4× resolution is shown in FIG. 5(d), with the resulting error shown in FIG. 5(e). The corresponding RGB image and the ground truth ToF depth maps are shown for comparison in FIGS. 5(f) and 5(g) respectively. The proposed method helps to recover the depth without losing information relating to fine structures, while simultaneously improving edges along depth discontinuities.

Figure 6:
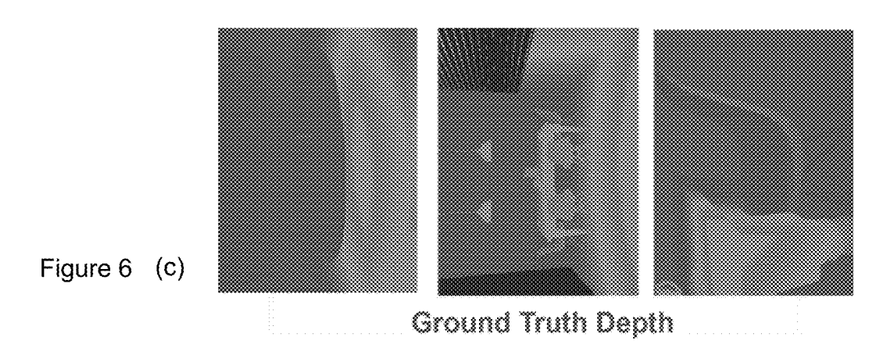
FIGS. 6(a)-(c) illustrate exemplary results for different scenes.

Further exemplary results for different scenes are shown in FIGS. 6(a)-(c). FIG. 6(a) shows input ToF depth maps for the scenes, depicted with small RGB images, FIG. 6(b) shows the respective upsampled outputs, and FIG. 6(c) shows the respective corresponding ground truth depth maps for the scenes.

Figure 7:
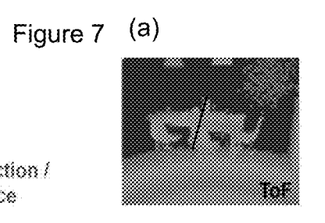
FIGS. 7(a)-(j) show results obtained using the proposed pipeline and results obtained using classical upsampling with a U-Net without multi-modality guidance for comparison.

FIGS. 7(a)-(j) show a comparison between results obtained using classical upsampling with a U-Net without multi-modality guidance and results obtained using the embodiments. FIG. 7(a) shows an input ToF depth map for a scene. FIGS. 7(b) and 7(c) show the ToF depth map and corresponding residual respectively obtained using classical upsampling after 32 k iterations. FIGS. 7(d) and 7(e) show the ToF depth map and corresponding residual respectively obtained using the approach described herein after 32 k iterations. FIG. 7(f) shows an input ToF depth map for an area of the scene at a higher magnification. FIGS. 7(g) and 7(h) show the ToF depth map and corresponding residual respectively obtained using classical upsampling after convergence. FIGS. 7(i) and 7(j) show the ToF depth map and corresponding residual respectively obtained using the approach described herein after convergence. The ToF depth maps in FIGS. 7(d) and 7(i) generated using the method described herein recover the depth without losing information relating to fine structures, whilst simultaneously improving edges along depth discontinuities.

Figure 8:
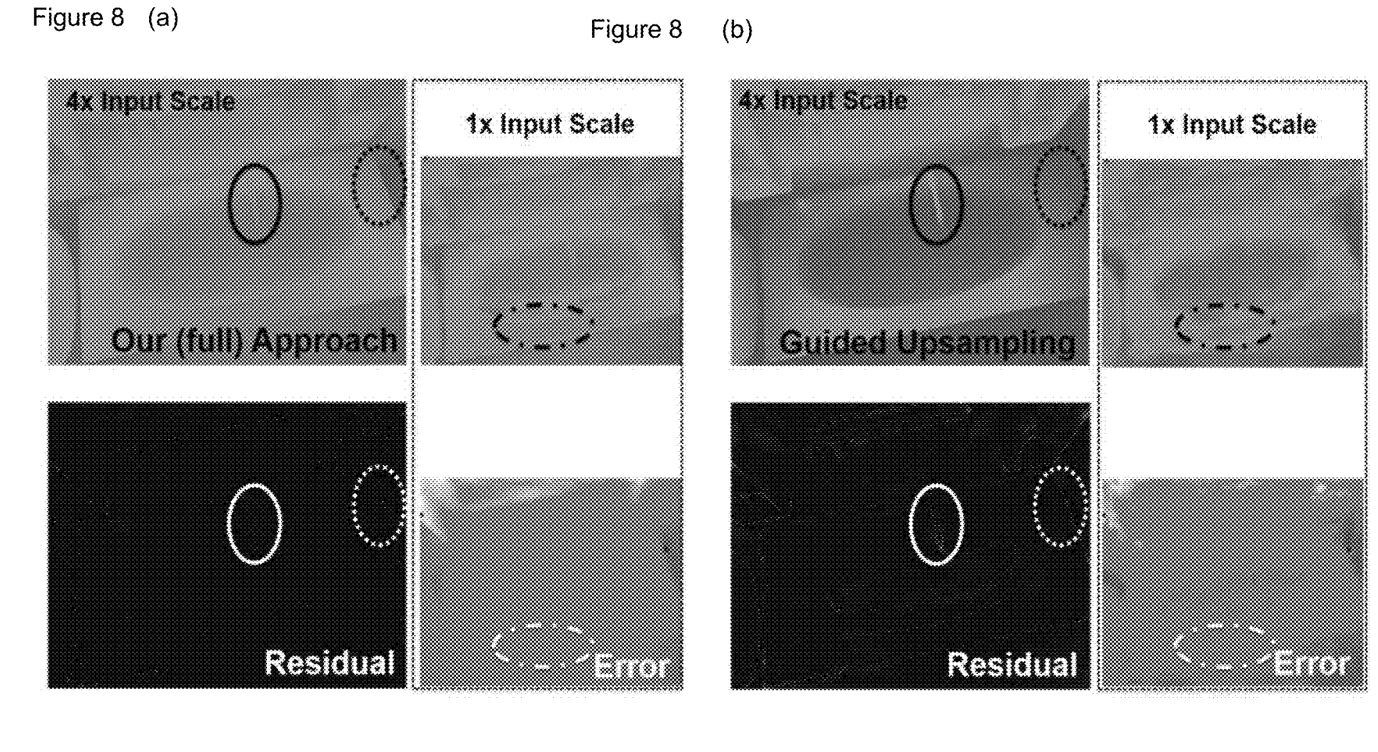
FIGS. 8(a)-(c) show an ablation study, with a comparison between images processed using guided upsampling only, depth injection only, and images processed using the multi-modality approach.
FIGS. 8(d) and 8(e) show ground truth images and RGB images.

In FIG. 8, results are shown in FIG. 8(a) compared to results obtained using GU only (no depth injection) in FIG. 8(b) and injection only (no GU) in FIG. 8(c). The corresponding ground truth image and RGB image are shown in FIGS. 8(d) and 8(e) respectively. Edges and fine structures are not refined for "injection only" during classical upsampling (FIG. 8(c)), which can be seen by comparing the residual along edges and fine structures in the dashed and full circles. The depth injection at low resolution helps the network to start with a good depth estimate at lower resolution, thus helping the GU for higher resolutions. In FIG. 8(a), the residual error of the depth prediction when compared to the ground truth is reduced compared to the other approaches. In particular, the GU improves the residual along depth discontinuities where the image gradient is usually strong, thereby recovering also fine structures.

Therefore depth injection may guide the network to predict a well-defined depth at lower resolution which gets refined with RGB-guidance during the hierarchical guided upsampling to recover the depth at four times the original resolution.

Figure 9:
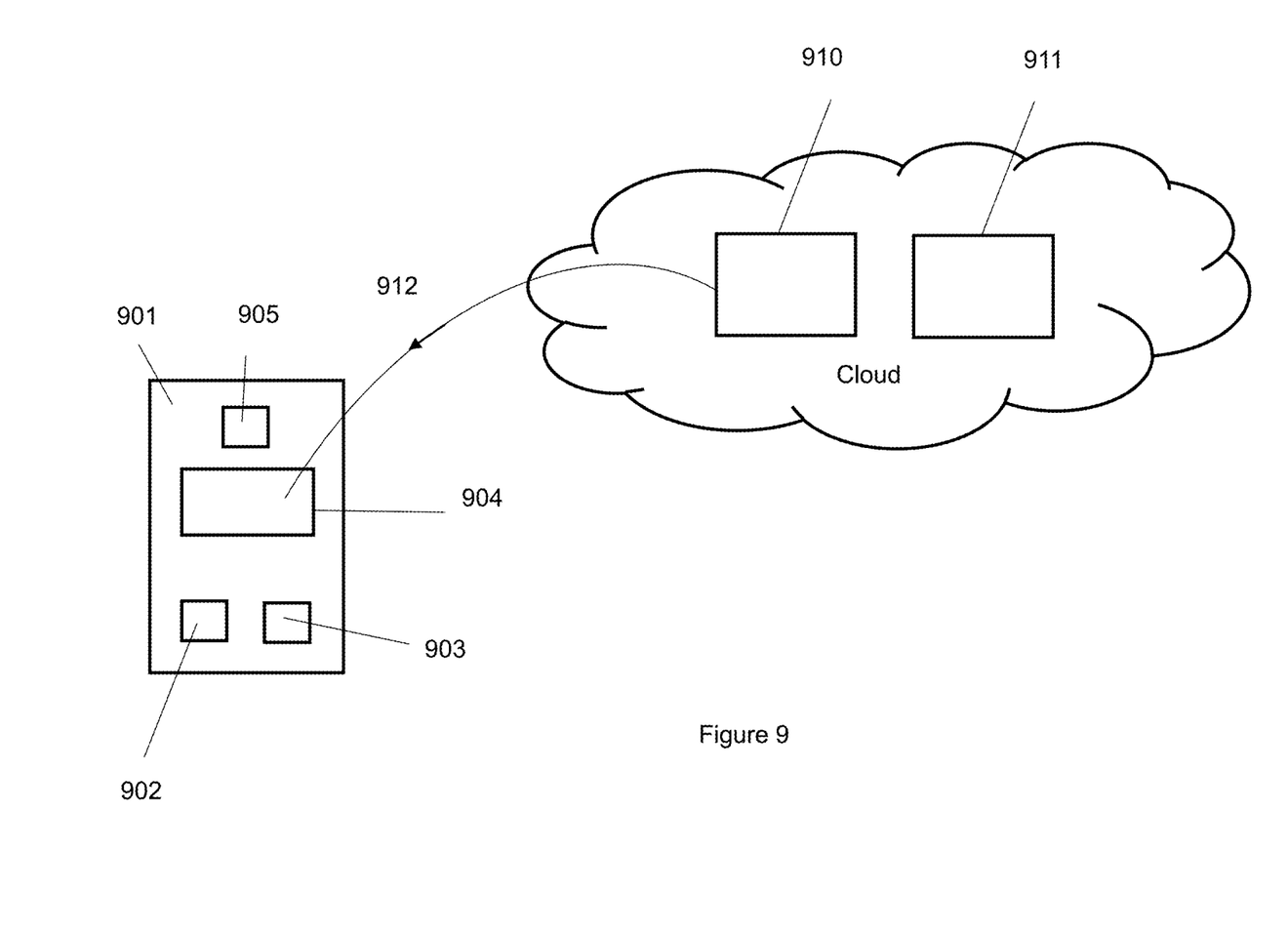
FIG. 9 shows an example of a camera configured to use the pipeline to process images taken by the camera.

FIG. 9 shows an example of a camera 901 configured to use the pipeline to process images taken by an image sensor 902 in the camera 901. The camera 901 also has a depth sensor 903 configured to collect ToF depth data. Such a camera 901 typically includes some onboard processing capability. This could be provided by the processor 904. The processor 904 could also be used for the essential functions of the device.

The transceiver 905 is capable of communicating over a network with other entities 910, 911. Those entities may be physically remote from the camera 901. The network may be a publicly accessible network such as the internet. The entities 910, 911 may be based in the cloud. Entity 910 is a computing entity. Entity 911 is a command and control entity. These entities are logical entities. In practice, they may each be provided by one or more physical devices such as servers and data stores, and the functions of two or more of the entities may be provided by a single physical device. Each physical device implementing an entity includes a processor and a memory. The devices may also include a transceiver for transmitting and receiving data to and from the transceiver 905 of camera 901. The memory stores in a non-transient way code that is executable by the processor to implement the respective entity in the manner described herein.

The command and control entity 911 may train the artificial intelligence models used in the pipeline. This is typically a computationally intensive task, even though the resulting model may be efficiently described, so it may be efficient for the development of the algorithm to be performed in the cloud, where it can be anticipated that significant energy and computing resource is available. It can be anticipated that this is more efficient than forming such a model at a typical camera.

In one implementation, once the algorithms have been developed in the cloud, the command and control entity can automatically form a corresponding model and cause it to be transmitted to the relevant camera device. In this example, the pipeline is implemented at the camera 901 by processor 904.

In another possible implementation, an image may be captured by the camera sensor 902 and the image data may be sent by the transceiver 905 to the cloud for processing in the pipeline. The resulting image could then be sent back to the camera 901, as shown at 912 in FIG. 9.

Therefore, the method may be deployed in multiple ways, for example in the cloud, on the device, or alternatively in dedicated hardware. As indicated above, the cloud facility could perform training to develop new algorithms or refine existing ones. Depending on the computing capability near to the data corpus, the training could either be undertaken close to the source data, or could be undertaken in the cloud, e.g., using an inference engine. The method may also be implemented at the camera, in a dedicated piece of hardware, or in the cloud.

An end-to-end trainable deep learning pipeline for ToF depth super-resolution may enrich the input ToF depth map with the encoded features from a low-resolution RAW correlation signal. The composed feature maps are hierarchically upsampled with co-modality guidance from aligned higher-resolution RGB images. By injecting the encoded RAW correlation signal, the ToF depth is enriched by the RAW correlation signal for domain stabilization and modality guidance.

The method utilizes cross-modality advantages. For example, ToF works well at low-light or for textureless areas, while RGB works well in bright scenes or scenes with darker-textured objects.

Because the pipeline is trainable end-to-end, accessing all three different modalities (RGB, depth and RAW correlation) at the same time, they can mutually improve the overall recovered depth map. This may increase the resolution, accuracy, and precision of the ToF depth map.

ToF depth errors may also be corrected. Missing data may be recovered, as the method measures farther away regions, and multi-path ambiguities may be resolved via RGB-guidance.

The network may use supervised or unsupervised training. The network may use multi-modality training, with synthetic correlation, RGB, ToF depth and ground truth renderings for direct supervision.

Additional adjustments may be made to the output ToF depth map in dependence on the ground truth image.

Each individual feature described herein and any combination of two or more such features are described to the extent that such features or combinations are capable of being carried out as a whole in the light of the common general knowledge of a person skilled in the art, regardless of whether such features or combinations of features solve any problems described herein, and without limitation to the scope of the embodiments. The embodiments may include any such individual feature or combination of features. In view of the foregoing description, it will be evident to a person skilled in the art that various modifications may be made within the scope of the embodiments.

The invention claimed is:

1. An image processing system configured to:
receive an input time-of-flight depth map representing a distance of objects in an image from a camera at a plurality of locations of pixels in the respective image, generate an improved time-of-flight depth map for the respective image, the input time-of-flight depth map having been generated from first correlation image data representing an overlap between emitted and reflected light signals at the plurality of locations of pixels at a given phase shift, and
generate the improved time-of-flight depth map from the input time-of-flight depth map, from a color representation of the respective image, and from second correlation image data, wherein the first correlation image data and the second correlation image data together comprise at least one correlation image.

2. The image processing system of claim 1, wherein the color representation of the respective image has a higher resolution than at least one of the input time-of-flight depth map and the at least one correlation image.

3. The image processing system of claim 1, wherein the system is further configured to generate the improved time-of-flight depth map by a trained artificial intelligence model.

4. The image processing system of claim 3, wherein the trained artificial intelligence model is an end-to-end trainable neural network.

5. The image processing system of claim 3, wherein the model is trained using at least one of: input time-of-flight depth maps, correlation images, and color representations of images.

6. The image processing system of claim 3, wherein the system is further configured to combine the input time-of-flight depth map with the at least one correlation image to form a correlation-enriched time-of-flight depth map.

7. The image processing system of claim 6, wherein the system is further configured to generate the improved time-of-flight depth map by hierarchically upsampling the correlation-enriched time-of-flight depth map in dependence on the color representation of the respective image.

8. The image processing system of claim 6, wherein the improved time-of-flight depth map has a higher resolution than the input time-of-flight depth map.

9. The image processing system of claim 8, wherein the color representation of the respective image is a color-separated representation.

10. A method, comprising:
generating an input time-of-flight depth map from first correlation image data representing an overlap between emitted and reflected light signals at a plurality of locations of pixels at a given phase shift, wherein the input time-of-flight depth map represents a distance of objects in the at least one correlation image from a camera at the plurality of locations of pixels in the respective image; and
generating an improved time-of-flight depth map from the input time-of-flight depth map, from on a color representation of the respective image, and from second correlation image data, wherein the first correlation image data and the second correlation image data together comprise at least one correlation image.

11. The method of claim 10, wherein the color representation of the respective image has a higher resolution than at least one of the input time-of-flight depth map and the at least one correlation image.

12. The method of claim 10, further comprising:
generating the improved time-of-flight depth map by a trained artificial intelligence model.

13. The method of claim 12, wherein the trained artificial intelligence model is an end-to-end trainable neural network.

14. The method of claim 10, further comprising:
combining the input time-of-flight map with the at least one correlation image to form a correlation-enriched time-of-flight depth map.

15. The method of claim 14, further comprising:
hierarchically upsampling the correlation-enriched time-of-flight depth map in dependence on the color representation of the respective image.

* * * * *